US006613820B2

(12) United States Patent
Fujiguchi et al.

(10) Patent No.: US 6,613,820 B2
(45) Date of Patent: *Sep. 2, 2003

(54) POLYCARBONATE RESIN COMPOSITION

(75) Inventors: Tomohide Fujiguchi, Tochigi Prefecture (JP); Kim Choate, Utsunomiya (JP); Yuzuru Sawano, Utsunomiya (JP); Akihiro Saito, Utsunomiya (JP); Hideyuki Itoi, Utsunomiya (JP)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 152 days.

(21) Appl. No.: 09/460,625

(22) Filed: Dec. 14, 1999

(65) Prior Publication Data

US 2002/0165300 A1 Nov. 7, 2002

Related U.S. Application Data

(63) Continuation-in-part of application No. 09/392,683, filed on Sep. 9, 1999, which is a continuation-in-part of application No. 09/140,006, filed on Aug. 26, 1998, now abandoned.

(30) Foreign Application Priority Data

Aug. 29, 1997 (JP) .............................. 9-249865
Dec. 24, 1998 (JP) .............................. 10-366465

(51) Int. Cl.⁷ .......................... C08L 69/00; C08K 5/523
(52) U.S. Cl. ................... 524/109; 524/127; 524/141
(58) Field of Search .................. 524/109, 127, 524/141

(56) References Cited

U.S. PATENT DOCUMENTS

| 3,125,529 A | 3/1964 | Simmons et al. |
| 3,169,121 A | 2/1965 | Goldberg |
| 3,553,155 A | 1/1971 | Garrett |
| 3,671,487 A | 6/1972 | Abolins |
| 3,723,373 A | 3/1973 | Lucas |
| 4,487,896 A | 12/1984 | Mark et al. |
| 4,579,906 A | 4/1986 | Zabrocki et al. |
| 4,624,986 A | 11/1986 | Weber et al. |
| 4,972,011 A | 11/1990 | Richardson et al. |
| 5,026,777 A | 6/1991 | Jalbert et al. |
| 5,072,014 A | 12/1991 | Flury |
| 5,102,932 A | 4/1992 | Gainer |
| 5,115,005 A | 5/1992 | Horner |
| 5,130,452 A | 7/1992 | Flury et al. |
| 5,132,346 A | 7/1992 | Flury |
| 5,204,394 A | 4/1993 | Gosens et al. |
| 5,300,568 A | 4/1994 | Abe et al. |
| 5,302,645 A | 4/1994 | Nakano et al. |
| 5,521,230 A | 5/1996 | Bhatia et al. |
| 5,621,029 A | 4/1997 | Eckel et al. |
| 5,663,280 A | 9/1997 | Ogoe et al. |
| 5,693,697 A | * 12/1997 | Weider |
| 5,723,526 A | * 3/1998 | Nagasawa |
| 5,741,838 A | 4/1998 | Fuhr et al. |
| 5,744,526 A | * 4/1998 | Goossens |
| 5,750,756 A | 5/1998 | Bright et al. |
| 5,900,446 A | * 5/1999 | Nishihara |
| 5,961,915 A | * 10/1999 | Toyouchi |
| 6,093,760 A | 7/2000 | Nishihara et al. |
| 6,127,465 A | * 10/2000 | Nodera |

FOREIGN PATENT DOCUMENTS

| EP | 0 360 578 B1 | 9/1989 |
| EP | 0641827 | 3/1995 |
| EP | 0 690 063 B1 | 6/1995 |
| EP | 0 739 914 A1 | 10/1996 |
| EP | 0758003 | 2/1997 |
| EP | 0829517 | 3/1998 |
| JP | 08-302175 | * 11/1996 |
| WO | WO 91/07466 | 5/1991 |
| WO | 91/18052 | * 11/1991 |
| WO | WO 96/13508 | 5/1996 |
| WO | WO 9627637 | 9/1996 |
| WO | WO 9911713 | 3/1999 |
| WO | PCT/US 99/30197 | 5/2000 |

OTHER PUBLICATIONS

Derwent Abstract of J10251468.
Caplus Abstract for JP 09100405.
Caplus Abstract for JP 10025399.
Caplus Abstract for JP 05186681.
Caplus Abstract for JP 08239551.
Pending application Ser. No. 09/392683 filed Sep. 9, 1999 entitled "Polycarbonate Resin Composition" by inventor Yuzuru Sawano (Certified translation of HEI–9–249865).
Chemical Abstract of J10158498, J08239565, J10147701, J09310011.
Chemical Abstract J07146873, J07238218, J06172611, J10251468.
Search Report PCT/US99/30197.

* cited by examiner

*Primary Examiner*—David J. Buttner

(57) ABSTRACT

To provide a polycarbonate resin composition that has excellent moisture resistance, good flame resistance, and markedly superior mechanical strength. Means for Solution: A resin composition containing (A) 1 to 99 weight parts of a polycarbonate resin having a viscosity average molecular weight of 10,000 to 100,000 and (B) 1 to 99 weight parts of a styrene resin, and also containing (C) a phosphoric ester compound with an acid value of 1 or less, in an amount of 1 to 40 weight parts per combined 100 weight parts of (A)+(B), and (D) a reinforcing agent in an amount of 1 to 100 weight parts per combined 100 weight parts of (A)+(B)+(C).

16 Claims, No Drawings

POLYCARBONATE RESIN COMPOSITION

The present application is a continuation-in-part of U.S. patent application Ser. No. 09/392,683 filed Sep. 9, 1999, which is a continuation-in-part of U.S. patent application Ser. No. 09/140,006 filed Aug. 26, 1998, now abandoned which claims priority from Japanese Patent Application Serial No. 09-249,865 filed Aug. 29, 1997. The present application is further based upon and claims priority from Japanese Application No. HEI 10-366465 filed Dec. 24, 1998. All of the above patent applications are hereby incorporated by reference.

BACKGROUND OF THE INVENTION

The present invention relates to a polycarbonate resin composition. Polycarbonate resins (PC), or polymer alloys produced by blending one of these with a styrene resin, such as an ABS resin (acrylonitrile/butadiene/styrene copolymer), are widely used in electrical and electronic parts, photocopiers, printers, facsimiles, personal computers, notebook and portable computers, and other such office automation equipment, portable telephones and other such communications equipment, and so on.

Products have increasingly needed to be smaller and lighter in these applications in recent years, and novel molding methods have been attempted in an effort to meet these needs. There is also an increasing need for resins that can be molded into thinner articles and can be molded more precisely, and for these resins to have better flame resistance and other such properties.

The addition of glass fibers, talc, carbon fibers, and other such reinforcing agents so as to improve rigidity and dimensional stability has been a common practice in the past in an effort to allow thinner and more precise molding.

The manufacture and use [of these resins] have been surging in Southeast Asia in recent years. In these areas, products are commonly used and stored in an environment of high humidity, and the degradation of physical properties due to the low moisture resistance of the resin in a product is often a cause for concern. It is therefore essential that the moisture resistance of resins used in the above-mentioned products be enhanced.

A polycarbonate resin (PC) or a polymer alloy comprising a blend of a polycarbonate resin and a styrene resin is not generally considered to have high moisture resistance. This is particularly true with a flame resistant resin composition or with a resin composition that has been reinforced with a reinforcing agent such as carbon fibers.

The present applicant has already invented a polycarbonate resin composition having excellent moisture resistance and good flame resistance, and in Japanese Patent Application 10-216487 has applied for a patent for a polycarbonate resin composition containing (A) 1 to 99 weight parts of a polycarbonate resin having a viscosity average molecular weight of 10,000 to 100,000 and (B) 1 to 99 weight parts of (B-1) a copolymer whose structural components are (a) an aromatic vinyl monomer component, (b) a vinyl cyanide monomer component, and (c) a rubber-like polymer and/or (B-2) a copolymer whose structural components are (a) an aromatic vinyl monomer component and (b) a vinyl cyanide monomer component, where the weight average molecular weight of the above-mentioned (B-2) is from 30,000 to 200,000, and where the alkali metal content in each case is no more than 1 ppm, and in which (C) a phosphoric ester compound is added in an amount of 0 to 40 weight parts per combined 100 weight parts of the above-mentioned components (A) and (B).

Problems Which the Invention is Intended to Solve

The present invention provides a polycarbonate resin composition that has superior moisture resistance, good flame resistance, and markedly superior mechanical strength.

Means Used to Solve the Above-Mentioned Problems

The inventors arrived at the following present invention as a result of various investigations aimed at solving the above problems.

Specifically, the present invention is (1) a resin composition containing:

(A) 1 to 99 weight parts of a polycarbonate resin having a viscosity average molecular weight of 10,000 to 100,000 and (B) 1 to 99 weight parts of a styrene resin, and also containing:

(C) a phosphoric ester compound with an acid value of 1 or less, in an amount of 1 to 40 weight parts per combined 100 weight parts of (A)+(B), and (D) a reinforcing agent in an amount of 1 to 100 weight parts per combined 100 weight parts of (A)+(B)+(C).

As a result of diligent investigation aimed at further enhancing the impact resistance of the above-mentioned resin composition (1) without lowering its flame resistance, the inventors perfected the present invention of the following preferred aspects upon discovering that the above-mentioned problems can be solved by adding a specific amount of the following (E) compound rubber-based graft copolymer to the above-mentioned resin Composition (1). Examples of preferred aspects include the following.

(2) The resin composition given in (1) above, further containing (E) a compound rubber-based graft copolymer produced by grafting a vinyl monomer to a compound rubber containing a polyorganosiloxane and a polyalkyl (meth)acrylate, in an amount of 0 to 20 weight parts per combined 100 weight parts of (A)+(B)+(C).

(3) The resin composition given in (2) above, containing (E) in an amount of 1 to 10 weight parts.

(4) The resin composition given in any of (1) to (3) above, wherein the amount of alkali metal contained in (B) is 1 weight ppm or less.

(5) The resin composition given in any of (1) to (3) above, wherein the amount of alkali metal contained in (B) is 0.5 weight ppm or less.

(6) The resin composition given in any of (1) to (3) above, wherein the amount of alkali metal contained in (B) is 0.1 weight ppm or less.

(7) The resin composition given in any of (1) to (6) above, wherein the alkali metal contained in (B) is sodium and/or potassium.

(8) The resin composition given in any of (1) to (7) above, wherein (B) is one more types of resin selected from the group consisting of HIPS (high impact polystyrene), ABS resin (acrylonitrile/butadiene/styrene copolymer), AES resin (acrylonitrile/ethylene/propylene/styrene copolymer), ACS resin (acrylonitrile/chlorinated polyethylene/styrene copolymer), and AAS resin (acrylonitrile/acrylic elastomer/styrene copolymer).

(9) The resin composition given in any of (1) to (8) above, wherein the viscosity average molecular weight of (A) is 10,000 to 40,000.

(10) The resin composition given in any of (1) to (9) above, wherein (C) is contained in an amount of 3 to 30 weight parts.

(11) The resin composition given in any of (1) to (9) above, wherein (C) is contained in an amount of 5 to 20 weight parts.

(12) The resin composition given in any of (1) to (11) above, further containing
(F) an epoxy-based stabilizer in an amount of 0.01 to 10 weight parts per combined 100 weight parts of (A)+(B).

(13) The resin composition given in (12) above, wherein (F) is contained in an amount of 0.1 to 0.5 weight parts.

(14) The resin composition given in (12) or (13) above, wherein the epoxy-based stabilizer (F) is 3,4-epoxycyclohexylmethyl-3',4'-epoxycyclohexane carboxylate.

(15) The resin composition given in any of (1) to (14) above, wherein the polycarbonate resin (A) is manufactured by melt polymerization.

(16) The resin composition given in any of (1) to (15) above, wherein the reinforcing agent (D) is at least one type of agent selected from the group consisting of talc, glass fibers, carbon fibers, glass flakes, milled glass, wollastonite, potassium titanate, calcium carbonate, barium sulfate, and mica.

(17) The resin composition given in any of(1) to (16) above, further containing (G) 0.01 to 3 weight parts of a fluorinated polyolefin per combined 100 weight parts of (A)+(B).

DETAILED DESCRIPTION OF THE INVENTION

The polycarbonate resin (A) used in the present invention is an aromatic polycarbonate made by a known phosgene process or melt process. Polycarbonate resins such as this are discussed, for example, in Japanese Laid-Open Patent Applications 63-215763 and 2-124,934. Examples of the diphenol used as a raw material include 2,2-bis(4-hydroxyphenyl)propane (known as bisphenol A); 2,2-bis-(3,5-dibromo-4-hydroxyphenyl)propane; 2,2-bis(3,5-dimethyl-4-hydroxyphenyl)cyclohexane; 1,1-bis(3,5-dimethyl-4-hydroxyphenyl)cyclohexane; 1,1-bis(4-hydroxyphenyl)decane; 1,4-bis(4-hydroxyphenyl)propane; 1,1-hydroxyphenyl)cyclo dodecane; 1,1-bis(3,5-dimethyl-4-hydroxyphenyl)cyclododecane; 4,4-dihydroxydiphenyl ether; 4,4-thiodiphenol; 4,4-dihydroxy-3,3-dichlorodiphenyl ether; and 4,4-dihydroxy-2,5-dihydroxyphenyl ether. Examples of precursor substances used to introduce the carbonate include phosgene and diphenyl carbonate.

The lower limit to the viscosity average molecular weight (Mv) of the polycarbonate resin (A) in the present invention is 10,000, with 21,000 being preferable and 22,000 being even better. The upper limit is 100,000, with 40,000 being preferable from a practical standpoint. Here, the viscosity average molecular weight (Mv) is determined by measuring the intrinsic viscosity [η] at 20° C. in methylene chloride, and calculating [the viscosity average molecular weight] from the Mark-Houwink viscosity formula:

[Mathematical Formula 1]

$$[\eta]=K(Mv)^a$$

(where $K=1.23 \times 10^{-4}$, and $a=0.83$).

The styrene resin (B) used in the present invention is a component composed of (B-1) a styrene-containing graft copolymer and/or (B-2) a styrene polymer.

The styrene-containing graft copolymer (B-1) is obtained by grafting (a) an aromatic vinyl monomer component, or, as needed, a mixture of this and (b) a copolymerizable vinyl monomer component, to (c) a rubber-like polymer.

Examples of the aromatic vinyl monomer component (a) include styrene, α-methylstyrene, o-, m-, or p-methylstyrene, vinylxylene, monochlorostyrene, dichlorostyrene, monobromostyrene, dibromostyrene, fluorostyrene, p-tert-butylstyrene, ethylstyrene, and vinylnaphthalene. These can be used singly or in combinations of two or more types. α-Methylstyrene is preferable.

Examples of the copolymerizable vinyl monomer (b) include acrylonitrile, methacrylonitrile, acrylic acid, methacrylic acid, and other such α- and β-unsaturated carboxylic acids; methyl (meth)acrylate, ethyl (meth)acrylate, propyl (meth)acrylate, butyl (meth)acrylate, 2-ethyl (meth)acrylate, 2-ethylhexyl methacrylate, and other such α- and β-unsaturated carboxylic esters; maleic anhydride, itaconic anhydride, and other such α- and β-unsaturated carboxylic anhydrides; maleimide, N-methylmaleimide, N-ethylmaleimide, N-phenylmaleimide, N-o-chlorophenylmaleimide, and other such α- and β-unsaturated carboxylic imide compounds. These can be used singly or in combinations of two or more types. There are no particular restrictions on the compositional ratio of these, which can be selected as dictated by the application.

Examples of the rubber-like polymer (c) include diene rubbers such as polybutadiene, polyisoprene, random and block copolymers of styrene and butadiene, hydrogenated versions of the above block copolymers, acrylonitrile/butadiene copolymers, and butadiene/isoprene copolymers; random and block copolymers of ethylene and propylene; copolymers of ethylene and α-olefins; copolymers of ethylene and an unsaturated carboxylic ester, such as ethylene/methacrylate and ethylene/butyl acrylate; copolymers of an acrylic ester and butadiene, such as a copolymer of butyl acrylate and butadiene or another such acrylic elastomer; copolymers of ethylene and a vinyl ester of a fatty acid, such as ethylene/vinyl acetate; ethylene/propylene/non-conjugated diene terpolymers, such as an ethylene/propylene/hexadiene copolymer; copolymers of butylene and isoprene; and chlorinated polyethylene. These can be used singly or as a combination of two or more types. Preferable rubber-like polymers are ethylene/propylene/non-conjugated diene terpolymers, diene rubbers, and acrylic elastomers, with polybutadiene and copolymers of styrene and butadiene being particularly favorable.

There are no particular restrictions on the compositional ratios of the above-mentioned (a), (b), and (c), which should be selected as dictated by the application.

It is preferable for the styrene-containing graft polymer (B-1) to be HIPS (high impact polystyrene), an ABS resin (acrylonitrile/butadiene/styrene copolymer), an AES resin (acrylonitrile/ethylene/propylene/styrene copolymer), an ACS resin (acrylonitrile/chlorinated polyethylene/styrene copolymer), or an AAS resin (acrylonitrile/acrylic elastomer/styrene copolymer).

The styrene-containing graft copolymer (B-2) is obtained by using a known method to polymerize (a) an aromatic vinyl monomer component, or, as needed, a mixture of this and (b) a copolymerizable vinyl monomer component. (B-2) serves to improve the moldability (fluidity) of the resin.

The same substances as listed above can be used as the aromatic vinyl monomer component (a), and the use of styrene or α-methylstyrene is preferable.

The same substances as listed above can also be used as the copolymerizable vinyl monomer (b). These can be used singly or in combinations of two or more types. There are no particular restrictions on the compositional ratio of these, which can be selected as dictated by the application. Here, there are no particular restrictions on the compositional ratio (a)/(b), but in the (B-2) component it is preferable for (a) to account for 50 to 95 wt %, and preferably 65 to 92 wt %, and for (b) to account for 5 to 50 wt %, and preferably 8 to 38 wt %. Preferred examples of the styrene polymer of (B-2) include a styrene resin and an SAN resin (styrene/acrylonitrile copolymer).

In the present invention, the upper limit to the weight average molecular weight (Mw) of the styrene polymer (B-2) should be 200,000, with 110,000 being preferable, and the lower limit is 30,000.

There are no particular restrictions on the method for manufacturing the copolymer that serves as component (B), and any ordinary, known method can be used, such as bulk polymerization, melt polymerization, bulk suspension polymerization, suspension polymerization, or emulsion polymerization. It is also possible to blend separately copolymerized resins. The use of bulk polymerization, melt polymerization, or bulk suspension polymerization is preferred.

The alkali metal content of component (B) in the present invention should be 1 weight ppm or less, and preferably 0.5 weight ppm or less, and even more preferably 0.1 weight ppm or less. Also, out of the total alkali metals, the content of sodium and/or potassium in component (B) should be 1 weight ppm or less, and preferably 0.5 weight ppm or less, and even more preferably 0.1 weight ppm or less.

Component (C) in the present invention is a phosphoric ester compound, and serves as a flame retardant. It is important that this phosphoric ester have an acid value of 1 or less, with 0.5 or less being preferable, 0.2 or less being even better, and 0.1 or less being better yet. It is particularly favorable for this acid value to be infinitely close to zero because the resin composition of the present invention will have enhanced hydrolysis resistance.

Examples of phosphoric ester compounds include the compounds expressed by the following formula (I).

[Chemical Formula 1]

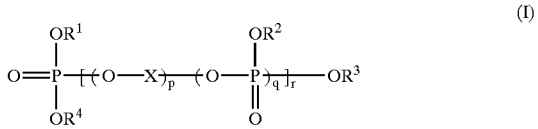

(I)

Where $R^1$, $R^2$, $R^3$, and $R^4$ are each independently a hydrogen atom or an organic group, with the case of $R^1=R^2=R^3=R^4=H$ being excluded. X is a divalent or higher organic group, p is 0 or 1, q is an integer of at least 1, such as an integer of 30 or less, and r is an integer of at least 0.) Other phosphoric ester compounds may also be used, however.

Examples of organic groups in the above-mentioned formula (I) include alkyl groups, cycloalkyl groups, and aryl groups. Examples of substituents in the case of substitution include alkyl groups, alkoxy groups, alkylthio groups, halogens, aryl groups, aryloxy groups, arylthio groups, and halogenated aryl groups. Groups in which these substituents are combined (such as arylalkoxyalkyl groups), and groups in which these substituents are combined by bonding with oxygen atoms, sulfur atoms, nitrogen atoms, or the like (such as arylsulfonylaryl groups), may also be used as substituents. "Dihydric or higher organic group" refers to a dihydric or higher group produced by removing one or more of the hydrogen atoms bonded to carbon atoms from the above-mentioned organic groups. Examples include groups derived from polynuclear phenols, such as bisphenols, and alkylene groups, and preferably (substituted) phenylene groups. The relative positions of the two or more free valences are not important. Particularly favorable examples include hydroquinone, resorcinol, diphenylolmethane, diphenyloldimethylmethane, dihydroxydiphenyl, p,p'-dihydroxydiphenylsulfone, bisphenol A, bisphenol S, and dihydroxynaphthalene.

Specific examples of phosphoric ester compounds include trimethyl phosphate, triethyl phosphate, tributyl phosphate, trioctyl phosphate, tributoxyethyl phosphate, triphenyl phosphate, tricresyl phosphate, cresylphenyl phosphate, octyldiphenyl phosphate, diisopropylphenyl phosphate, tris (chloroethyl)phosphate, tris(dichloropropyl)phosphate, tris (chloropropyl)phosphate, bis(2,3-dibromopropyl)-2,3-dichloropropyl phosphate, tris(2,3-dibromopropyl) phosphate, bis(chloropropyl)monooctyl phosphate, bisphenol A tetraphenyl diphosphate, bisphenol A tetraxylyl diphosphate, hydroquinone tetraphenyl diphosphate, hydroquinone tetracresyl diphosphate, hydroquinone tetraxylyl diphosphate, a bisphenol A bisphosphate in which $R^1$ to $R^4$ are each an alkoxy, such as methoxy, ethoxy, or propoxy, and preferably a (substituted) phenoxy, such as methyl (substituted) phenoxy, or hydroquinone bisphosphate, resorcinol bisphosphate, trioxybenzene triphosphate. The use of triphenyl phosphate and various bisphosphates is preferable.

The upper limit to the amount in which the above-mentioned component (C) is used is 40 weight parts, and preferably 30 weight parts, and even more preferably 20 weight parts, and the lower limit is 1 weight part, and preferably 3 weight parts, and even more preferably 5 weight parts, per combined 100 weight parts of (A)+(B). The effect of the present invention will not be fully realized if the amount of component (C) is below the above-mentioned lower limit, and heat resistance will suffer if the above-mentioned upper limit is exceeded.

There are no particular restrictions on the reinforcing agent (D) used in the present invention, as long as it will impart the required functions to a thin-walled molded article, such as rigidity, dimensional stability, and mechanical strength, but examples include talc, mica, glass fibers, glass flakes, milled glass, carbon fibers, aramid fibers, silica, glass beads, glass balloons, silica balloons, metal fibers, metal powder, wollastonite, potassium titanate, silicon carbide, calcium carbonate, magnesium carbonate, graphite, barium sulfate, barium sulfate, and charcoal powder. Preferred materials are talc, glass fibers, carbon fibers, glass flakes, milled glass, wollastonite, potassium titanate, calcium carbonate, barium sulfate, and mica. The reinforcing agent used in the present invention may be used alone or as a mixture of two or more types.

The upper limit to the amount in which the above-mentioned component (D) is added should be 100 weight parts, and preferably 70 weight parts, and the lower limit should be 1 weight part, and preferably 4 weight parts, per combined 100 weight parts of (A)+(B)+(C). Sufficient rigidity and mechanical strength will not be obtained if the added amount of component (D) is below the above-mentioned lower limit, and impact resistance and fluidity (moldability) will suffer markedly if the above-mentioned upper limit is exceeded.

Component (E) used in the present invention is a compound rubber-based graft copolymer produced by the graft copolymerization of one or more types of vinyl monomer to a compound rubber having a structure in which a polyorganosiloxane rubber component and a polyalkyl (meth) acrylate rubber component are compounded by being intertwined with one another.

A compound rubber-based graft copolymer such as this can be manufactured, for example, by a method disclosed in Japanese Laid-Open Patent Applications 64-79257,7-207137, and 7-207132.

This compound rubber can be manufactured most favorably by emulsion polymerization. First, a latex of a polyorganosiloxane rubber is prepared, then a monomer for synthesizing an alkyl (meth)acrylate rubber is used to impregnate the rubber particles of the polyorganosiloxane rubber latex, after which monomer for synthesizing an alkyl (meth)acrylate rubber is polymerized.

The organosiloxane rubber component can be prepared, for example, by emulsion polymerization using the following organopolysiloxane and crosslinking agent (I), and a graft crosslinking agent (I) may be used simultaneously.

The organosiloxane can be, for example, a linear organosiloxane such as dimethylsiloxane, or any of various cyclic organosiloxanes with 3-member rings or higher, and preferably 3- to 6-member rings. Examples include hexamethyl-cyclotrisiloxane, octamethylcyclotetrasiloxane, decamethylcyclopentasiloxane, dodecamethylcyclohexasiloxane, trimethyltriphenylcyclotrisiloxane, tetramethyl tetraphenylcyclotetrasiloxane, and octaphenylcyclotetrasiloxane. These organosiloxanes may be used alone or as a mixture of two or more types. The amount in which these are used is 50 wt % or more, and preferably 70 wt % or more, of the polyorganosiloxane rubber component.

The crosslinking agent (I) can be tri- or tetrafunctional silane crosslinking agent, such as trimethoxymethylsilane, triethoxyphenylsilane, tetramethoxysilane, tetraethoxysilane, tetra-n-propoxysilane, or tetrabutoxysilane. The use of a tetrafunctional crosslinking agent is preferable, and of these, the use of tetraethoxysilane is particularly favorable. These crosslinking agents may be used alone or as a mixture of two or more types. The amount in which the crosslinking agent is used is preferably 0.1 to 30 wt % of the polyorganosiloxane rubber component.

The graft crosslinking agent (I) can be a compound which forms units expressed by the following formulas:
[Chemical Formula 2]

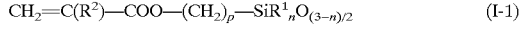

$$CH_2=C(R^2)-COO-(CH_2)_p-SiR^1{}_nO_{(3-n)/2} \quad (I\text{-}1)$$

[Chemical Formula 3]

$$CH_2=CH-SiR^1{}_nO_{(3-n)/2} \quad (I\text{-}2)$$

[Chemical Formula 4]

$$HS-(CH_2)_p-SiR^1{}_nO_{(3-n)/2} \quad (I\text{-}3)$$

(In the above formulas, $R^1$ is a lower alkyl group, such as the methyl group, ethyl group, or propyl group, or a phenyl group, $R^2$ is a hydrogen atom or a methyl group, n is 0, 1 or 2, and p is an integer from 1 to 6). (Meth)acryloyloxysiloxane capable of forming units of the above formula (I-1) is advantageous since the graft efficiency is high, allowing an effective grafted chain to be formed and exhibiting high impact resistance. A methacryloyloxysiloxane capable of forming units of the formula (I-1) is particularly favorable. Specific examples of methacryloxyloysiloxanes include β-methacryloyloxy-ethyldimethoxysilane, γ-methacryloyloxypropylmethoxydimethylsilane, γ-methacryloyl-oxypropyldimethoxymethylsilane, γ-methacryloyloxypropyltrimethylsilane, γ-methacryloyloxypropylethoxydiethylsilane, γ-methacryloyloxypropyldiethoxymethyl-silane, and δ-methacryloyloxybutyldiethoxymethylsilane. These may be used alone or as a mixture of two or more types. The amount in which the graft crosslinking agent is used is preferably 0 to 10 wt % of the polyorganosiloxane rubber component.

This latex of a polyorganosiloxane rubber component can be manufactured by the methods discussed, for example, in U.S. Pat. Nos. 2,891,920 and 3,294,725. For the practical application of this invention, it is preferable for this latex to be manufactured, for example, by a method in which a liquid mixture of organosiloxane, cross linking agent (I), and if desired, graft crosslinking agent (I) are subjected to shear mixing with water in the presence of a sulfonic acid emulsifier, such as an alkylbenzenesulfonic acid or an alkylsulfonic acid, by using a homogenizer, for example. The use of an alkylbenzenesulfonic acid is particularly favorable since it works not only as an emulsifier of organosiloxane but also as a polymerization initiator. If a metal salt of an alkylbenzenesulfonic acid, a metal salt of an alkylsulfonic acid, or the like is used concurrently here, it is effective to keep the polymer stable during graft polymerization.

The polyalkyl (meth)acrylate rubber component that constitutes part of the above-mentioned compound rubber can be synthesized using the following alkyl (meth)acrylates, crosslinking agents (II), and graft crosslinking agents (II).

Examples of alkyl (meth)acrylates include alkyl acrylates such as methyl acrylate, ethyl acrylate, n-propyl acrylate, n-butyl acrylate, and 2-ethylhexyl acrylate, and alkyl methacrylates such as hexyl methacrylate, 2-ethylhexyl methacrylate, and n-lauryl methacrylate. The use of n-butyl acrylate is particularly favorable.

Examples of the crosslinking agent (II) include ethylene glycol dimethacrylate, propylene glycol dimethacrylate, 1,3-butylene glycol dimethacrylate, and 1,4-butylene glycol dimethacrylate.

Examples of the graft crosslinking agent (II) include allyl methacrylate, triallyl cyanurate, and triallyl isocyanurate. Allyl methacrylate can also be used as a crosslinking agent. These crosslinking agents and graft crosslinking agents may be used alone or as a mixture of two or more types. The total amount in which these crosslinking agents and graft crosslinking agents are used is preferably 0.1 to 20 wt % of the polyalkyl (meth)acrylate rubber component.

The polymerization of the polyalkyl (meth)acrylate rubber component is carried out by adding the above-mentioned alkyl (meth)acrylate, crosslinking agent, and. graft crosslinking agent to a latex of a polyorganosiloxane rubber component neutralized by the addition of an aqueous solution of an alkali such as sodium hydroxide, potassium hydroxide, or sodium carbonate, so that the organosiloxane rubber particles are impregnated, and then allowing an ordinary radical polymerization initiator to act on the system. As the polymerization reaction proceeds, it forms a crosslinked network of polyalkyl (meth)acrylate rubber intertwined with the crosslinked network of polyorganosiloxane rubber, which yields a compound rubber latex comprising substantially inseparable polyorganosiloxane and polyalkyl (meth)acrylate rubber components. In the practical application of the present invention, it is preferable to use a rubber complex in which the main skeleton of the polyorganosiloxane rubber component has repeating units of dimethylsiloxane, and in which the main skeleton of the polyalkyl (meth)acrylate rubber component has repeating units of n-butyl acrylate.

The compound rubber prepared by emulsion polymerization as described above can be graft copolymerized with a vinyl monomer. The gel content of the this compound rubber as measured by extraction with toluene at 90° C. for 12 hours is preferably 80 wt % or higher.

To obtain a good balance between flame resistance, impact resistance, appearance, and so on, the proportion in which the polyorganosiloxane rubber component and the polyalkyl (meth)acrylate rubber component of the above-mentioned compound rubber should be 3 to 90 wt % of the former to 10 to 97 wt % of the latter, and furthermore, the average particle size of the rubber complex should be 0.08 to 0.6 μm.

Examples of vinyl monomers which can be graft polymerized to the above-mentioned compound rubber include aromatic alkenyl compounds such as styrene, α-methylstyrene, and vinyltoluene; methacrylic esters such as methyl methacrylate and 2-ethylhexyl methacrylate; acrylic esters such as methyl acrylate, ethyl acrylate, and butyl acrylate; and vinyl cyanide compounds such as acrylonitrile and methacrylonitrile. These may be used alone or as a mixture of two or more types. Methyl methacrylate is a particularly favorable vinyl monomer. The amount in which the vinyl monomer is used is preferably 5 to 70 wt % with respect to 30 to 95 wt % of the above-mentioned compound rubber.

The compound rubber graft copolymer (E) can be separated and recovered by pouring a compound rubber graft copolymer latex prepared by adding the above-mentioned vinyl monomer to the above-mentioned compound rubber latex and carrying out single- or multi-stage radical polymerization into hot water containing a dissolved metal, salt such as calcium chloride or magnesium sulfate, to precipitate and coagulate the desired copolymer.

A compound rubber graft copolymer (E) such this is also commercially available, for example, as Metablen S-2001 from Mitsubishi Rayon Co., Ltd.

Component (E) is used in an amount whose upper limit is 20 weight parts, and preferably 10 weight parts, and even more preferably 6 weight parts, per combined 100 weight parts of (A)+(B)+(C). Moldability will sacrificed if this upper limit is exceeded.

An epoxy-based stabilizer that serves as component (F) can be further added in the present invention in an effort to enhance hydrolysis resistance. 3,4-epoxycyclohexylmethyl-3',4'-epoxycyclohexane carboxylate is preferable as this epoxy-based stabilizer. This stabilizer is available as Seroxide 2021P from Daicel Chemical Industries, or as R-51 from Asahi Denka Kogyo. The added amount should be no higher than 10 weight parts, and preferably 0.5 weight part, and the lower limit is 0.01 weight part, and preferably 0.1 weight part, per combined 100 weight parts of (A)+(B). Mechanical strength will not be obtained if the above upper limit is exceeded, but no increase in hydrolysis resistance will be achieved below the above-mentioned lower limit. The epoxy-based stabilizer is not limited to the above structure.

A fluorinated polyolefin that serves as component (G) can be further added to the resin composition of the present invention as an anti-drip agent. Polytetrafluoroethylene can be used to advantage. Polytetrafluoroethylene is a white solid, and is available commercially, or it can be manufactured by a known method. For instance, it can be obtained by using a free radical catalyst (such as sodium, potassium, or ammonium peroxydisulfate) to polymerize tetrafluoroethylene in an aqueous medium at a pressure of 100 to 1000 psi and a temperature of 0 to 200° C., and preferably 20 to 100° C. Details of this process are disclosed in the U.S. Patent of Brubaker, U.S. Pat. No. 2,393,967.

Although it is not essential, it is preferable to use a resin in the form of relatively large particles, such as particles with an average size of 0.3 to 0.7 mm (mainly 0.5 mm). This is better than an ordinary polytetrafluoroethylene powder having a particle size of 0.05 to 0.5 mm. The reason a substance such as this with a relatively large particle size is particularly favorable is that it will disperse more readily in a polymer and will exhibit a tendency to bind polymers together and create a fibrous material. A favorable polytetrafluoroethylene such as this is called type 3 by ASTM, and is actually available as Teflon 6 from E.I. du Pont de Nemours. It is also available as Teflon 30J from Mitsui Dupont Fluorochemical. The upper limit to the amount in which the fluorinated polyolefin (G) is contained should be 3.0 weight parts, and preferably 1.0 weight part, and the lower limit should be 0.01 weight part, and preferably 0.05 weight part, per combined 100 weight parts of (A)+(B).

A polysiloxane or the like can be used as a flame retardant and an anti-drip agent, preferably in an amount of 0.1 to 20 weight parts per combined 100 weight parts of (A)+(B).

In addition to the various components discussed above, other additives commonly used in the mixing and molding of resins can be added to the resin composition of the present invention as dictated by the intended application, as long as the properties thereof are not compromised. Examples of these additives include pigments, dyes, heat resisting agents, stabilizers (antioxidants), weatherproofing agents (UV absorbents), lubricants, parting agents, crystal nucleators, plasticizers, fluidity improvers, and antistatic agents.

Examples of stabilizers include phosphorus-based stabilizers available from various stabilizer manufacturers as antioxidants. Specific examples include triphenyl phosphite, diphenylnonyl phosphite, tris(2,4-di-t-butylphenyl) phosphite, trisnonylphenyl phosphite, diphenylisooctyl phosphite, 2,2'-methylenebis(4,6-di-t-butylphenyl)octyl phosphite, diphenylisodecyl phosphite, diphenylmono(tridecyl)phosphite, 2,2'-ethylenebis(4,6-di-t-butylphenol) fluorophosphite, phenyldiisodecyl phosphite, phenyldi(tridecyl)phosphite, tris(2-ethylhexyl)phosphite, tris(isodecyl)phosphite, tris(tridecyl)phosphite, dibutyl hydrogenphosphite, trilauryl trithiophosphite, tetrakis(2,4-di-t-butylphenyl)-4,4'-biphenyl ene phosphonite, 4,4'-isopropylidenediphenol alkyl($C_{12}$–$C_{15}$)phosphite, 4,4'-butylidenebis (3-methyl-6-t-butylphenyl) ditridecylphosphite, bis(2,4-di-t-butylphenyl) pentaerythritol diphosphite, bis(2,6-di-t-butyl-4-methylphenyl)pentaerythritol diphosphite, bis(non ylphenyl)pentaerythritol diphosphite, distearylpentaerythritol diphosphite, phenyl-bisphenol A pentaerythritol diphosphite, tetraphenyldipropylene glycol diphosphite, 1,1,3-tris(2-methyl-4-di-tridecyl phosphite-5-t-butylphenyl)butane, and 3,4,5,6-dibenzo-1,2-oxaphosphane-2-oxide.

Examples of commercial products include Adekastab PEP-36, PEP-24, PEP-4C, and PEP-8 (all trademarks of Asahi Denka Kogyo), Irgafos 168 (trademark of Ciba-Geigy), Sandstab P-EPQ (trademark of Sandoz), Chelex L (trademark of Sakai Chemical Industries), 3P2S (trademark of Ihara Chemical Industries), Mark 329K and Mark P (both trademarks of Asahi Denka Kogyo), and Weston 618 (trademark of Sanko Kagaku).

Examples of other stabilizers include hindered phenol-based antioxidants, epoxy-based stabilizers, and sulfur-based stabilizers. Examples of hindered phenol-based antioxidants include n-octadecyl-3-(3',5'-di-t-butyl-4-hydroxyphenyl) propionate, 2,6-di-t-butyl-4-hydroxymethylphenol, 2,2'-methylenebis(4-methyl-6-t-butylphenol), and pentaerythritol-tetrakis[3-(3,5di-t-butyl-4-hydroxyphenyl) propionate. Examples of epoxy-based stabilizers include epoxified soybean oil, epoxified linseed oil, phenyl glycidyl ether, allyl glycidyl ether, and 3,4-epoxycyclohexylmethyl-3',4'-epoxycyclohexane carboxylate.

There are no particular restrictions on the amount in which these stabilizers are added, but an amount of 0.0001 to 5 weight parts per combined 100 weight parts of (A)+(B) is preferable.

Examples of parting agents include methylphenyl silicone oil and another such silicon-based parting agents, pentaerythritol tetrastearate, glycerol monostearate, montanic acid wax, poly-α-olefins, and other such ester-based parting agents or olefin-based parting agents. There are no particular restrictions on the amount in which these parting agents are added, but an amount of 0.0001 to 5 weight parts per combined 100 weight parts of (A)+(B) is preferable.

Any UV absorbent that is commonly used in PC resin compositions can be used as the UV absorbent it the present invention. Examples include benzotriazole-based UV absorbents, benzophenone-based UV absorbents, and salicylate-based UV absorbents. Examples of benzotriazole-based UV absorbents include 2-(2'-hydroxy-5'-methylphenyl) benzotriazole, 2-(2'-hydroxy-t-butylphenyl) benzotriazole, 2-(2'-hydroxy-5'-t-octylphenyl) benzotriazole, 2-(2'-hydroxy-3',5'-di-t-butylphenyl) benzotriazole, 2-(2'-(2'-hydroxy-3',5'-amylphenyl) benzotriazole, 2-(2'-hydroxy-3'-dodecyl-5'-(methylphenyl) benzotriazole, 2-(2'-hydroxy-3',5'-dicumylphenyl) benzotriazole, and 2,2'-methylenebis[4-(1,1,3,3-tetram ethylbutyl)-6-(2H-benzotriazol-2-yl)phenol]. A benzotriazole-based UV absorbent is available as UV531 from American Cyanamid. A benzophenone-based UV absorbent is available as UV531 from Cyanamid. Examples of salicylate-based UV absorbents include phenyl salicylate, p-t-butylphenyl salicylate and p-octylphenyl salicylate.

There are no particular restrictions on the amount in which these UV absorbents are added, but an amount of 0.0001 to 5 weight parts per combined 100 weight parts of (A)+(B) is preferable.

A miscibilizer can also be added to the thermoplastic resin composition pertaining to the present invention.

Miscibilizers include copolymers produced by grafting a polycarbonate to an acrylonitrile/styrene copolymer, and copolymers produced by grafting a polystyrene resin to a polycarbonate. For example, Modiper CH430, L430D, and L150D are available from Nippon Oil & Fats. Polymethyl methacrylate (PMMA) can also be used as a miscibilizer. There are no particular restrictions on the amount in which these miscibilizers are added, but an amount of 0.1 to 30 weight parts per combined 100 weight parts of (A)+(B) is preferable.

There are no particular restrictions on the method for manufacturing the resin composition of the present invention, and any ordinary method can be used satisfactorily. A melt mixing method, however, is generally preferable. It is possible to use a small amount of solvent, but this is generally unnecessary. Examples of the apparatus used in the manufacture include an extruder, Banbury mixer, roller, and kneader. This apparatus can be operated continuously or in batches. There are no particular restrictions on the order in which the components are mixed.

The present invention will now be described in further detail through working examples, but the present invention is not limited to or by these working examples.

WORKING EXAMPLES

The various substances used in the working and comparative examples are listed below.

<Component (A): Polycarbonate (PC)>

Lexan 141 (trademark of GE Plastics Japan; a polycarbonate of bisphenol A; the intrinsic viscosity measured at 20° C. in methylene chloride is 0.50 dL/g, and Mv≈23.000 (calculated value))

<Component (B): Styrene Resin>

ABS-1: ABS resin Suntac AT-07 (trademark of Mitsui Chemical)

ABS-2: ABS resin UX050 (trademark of Ube Sycon)

SAN: SAN resin SR05B (trademark of Ube Sycon)

<Component (C): Phosphoric Ester Compound>

FR-2: bisphenol A—diphosphate, CR741 (trademark of Daihachi Chemical), Acid Value 0.64

FR-3: bisphenol A—diphosphate, CR741S (trademark of Daihachi Chemical), acid value 0.63

FR-1: (comparative component): bisphenol A—diphosphate, CR741 (trademark of Daihachi Chemical), acid value 1.6

<Component (D): Reinforcing Agent>

Talc: LMS-200 (trademark of Fuji Talc Industries)

Glass fibers: FT116 (trademark of Asahi Fiberglass)

Carbon fibers: HTA-C6-SRS (trademark of Toho Rayon)

<Component (E): Compound Rubber-Based Graft Copolymer>

Metablen S-2001 (trademark of Mitsubishi Rayon)

Acrylic rubber (comparative component): Paraloid EX2315 (trademark of Kureha Chemical Industry)

<Component (F): Epoxy-Based Stabilizer>

3,4-epoxycyclohexylmethyl-3',4'-epoxycyclohexane carboxylate (Seroxide 2021P, trademark of Daicel Chemical Industries)

<Component (G): Fluorinated Polyolefin>

Polytetrafluoroethylene (PTFE): Teflon 30J (trademark of Mitsui Dupont Fluorochemical Working Examples 1 to 24 and Comparative Examples 1 to 11

The various components shown in Tables 2 to 5 were extruded from a twin-screw extruder at a screw speed of 200 rpm and a barrel temperature of 270 to 280° C., and the extrudate was cut into pellets.

The pellets thus manufactured were used to mold a test piece with an 5 80-ton injection molding machine made by Toyo Kikai Kinzoku. The molding conditions comprised a barrel temperature of 240° C. and a mold temperature of 60° C.

(1) Izod Impact Strength

The ⅛" notched Izod impact strength was measured according to ASTM D256.

(2) Tensile Strength and Tensile Elongation Measured according to ASTM D638.

(3) Flexural Strength and Flexural Modulus Measured according to ASTM D790.

(4) Melt Index (MI) Measured at 260° C. and a load of 5 kg according to ASTM D1238.

(5) Load Deflection Temperature Measured according to ASTM D648, using a test piece with a thickness of ¼ inch and a load of 18.6 kg/cm².

(6) Flame Resistance Test

Tests were conducted according to UL 94/VO, VI, or VII. Five test pieces with a thickness of 1/16 inch were tested according to the method set forth in Underwriters' Laboratories, Inc., Bulletin 94, "Combustion Tests for Materials Classification" (hereinafter referred to as UL-94). Using this test method, the sample material was evaluated to see whether it graded UL-94 V-0, V-I, or V-II on the basis of the results for five samples. The criteria for the various V grades in UL-94 are summarized below.

V-0: The average flame maintenance time after the ignition flame is removed is 10 seconds or less, and none of the samples drop particulate flames that ignite absorbent cotton.

V-I: The average flame maintenance time after the ignition flame is removed is 30 seconds or less, and none of the samples drop particulate flames that ignite absorbent cotton.

V-II: The average flame maintenance time after the ignition flame is removed is 30 seconds or less, and the samples drop particulate flames that ignite absorbent cotton.

(7) Moisture Resistance Test

A test piece was left in a high-temperature and high-humidity oven (80° C., 98% RH), after which the tensile strength was measured in the same manner as above.

(8) Quantification of Alkali Metal of Component (B)

The sample was ashed and dissolved in pure water, and quantification was performed by ICP and atomic absorption methods. The quantification results are given in Table 1 below.

(9) Measuring the Acid Value of Component (C)

Measured by the method given below.

<Phosphoric Ester Acid Value Measurement Method>

Measured by the following operation.

① 40 mL of a mixed solution of ethyl alcohol and water was measured out by measuring cylinder into a 200 mL triangular flask.

② 1 mL of a bromothymol blue solution was added by measuring pipette to this triangular flask, and titration was then performed with an N/10 sodium hydroxide solution until the color changed to blue-green.

③ Approximately 10 g of sample (component (C)) was measured out into this triangular flask, using an electronic balance and reading to the first decimal point (sample amount: S).

④ Titration was performed with an N/10 sodium hydroxide solution until the color changed to blue-green just as in ② (titration amount: A).

The acid value of the phosphoric ester was calculated from the following formula.

[Mathematical Formula 2]

$$\text{Acid value of phosphoric ester (KOH mg/g)} = (A \times F \times 5.61)/S$$

(Here, A is the amount (mL) of N/10 sodium hydroxide needed for the titration of the sample, F is the titer of the N/10 sodium hydroxide solution, and S is the amount of sample (g).)

The reagents used in the above measurements were as follows.

① Mixed Solution of Ethyl Alcohol and Water

Ethyl alcohol (guaranteed reagent) and ion exchanged water were mixed in a volumetric ratio of 9:1.

② Bromothymol Blue Solution 20 mL of 95 vol % ethyl alcohol (guaranteed reagent) was added to 0.10 g of bromothymol blue, and this was diluted with water and brought up to 100 mL.

③ N/10 sodium hydroxide solution:

Standardization of the titer of N/10 sodium hydroxide solution

Sulfamic acid (standard reagent) was dried in a vacuum sulfuric acid desiccator, 0.2 to 0.3 g thereof was weighed out and put in a 200 mL triangular flask, approximately 25 mL of water was then added and dissolved, and titration was performed with an N/10 sodium hydroxide solution using a bromothymol blue solution as an indicator. The titer was calculated from the following formula.

[Mathematical Formula 3]

$$\text{Titer} = (S \times P)/(0.9709 \times A)$$

(Here, S is the amount (g) of sulfamic acid used, P is the purity (%) of the sulfamic acid, and A is the titration amount (mL) of the N/10 sodium hydroxide solution.)

TABLE 1

| | Amount of Alkali Metal in Component (B) | |
|---|---|---|
| | Alkali metal (units: weight ppm) | |
| Component (B) | Na | K |
| ABS - 1 (AT-07) | <0.5 | <0.5 |
| ABS - 2 (UX050) | 34 | 128 |
| SAN (SR05B) | <0.5 | <0.5 |

TABLE 2

| Resin composition (weight parts) | | Working Ex. 1 | Working Ex. 2 | Working Ex. 3 | Working Ex. 4 | Working Ex. 5 | Working Ex. 6 | Working Ex. 7 | Working Ex. 8 | Comp. Ex. 1 | Comp. Ex. 2 | Comp. Ex. 3 | Comp. Ex. 4 |
|---|---|---|---|---|---|---|---|---|---|---|---|---|---|
| (A) | PC | 62 | 62 | 62 | 62 | 62 | 62 | 62 | 62 | 62 | 62 | 62 | 62 |
| (B) | ABS-1 | — | — | — | — | 15 | 15 | 15 | 15 | — | 15 | — | 15 |
| | ABS-2 | 6 | 6 | 6 | 6 | — | — | — | — | 6 | — | 6 | — |
| | SAN | 9 | 9 | 9 | 9 | — | — | — | — | 9 | — | 9 | — |
| (C) | FR-3 (acid value: 0.03) | 13 | 13 | 13 | 13 | 13 | 13 | 13 | 13 | 13 | 13 | 13 | 13 |
| (D) | Glass fibers | 10 | — | 8 | — | 10 | — | 8 | — | — | — | 150 | 150 |
| | Talc | — | 10 | 5 | — | — | 10 | 5 | — | — | — | — | — |
| | Carbon fibers | — | — | — | 10 | — | — | — | 10 | — | — | — | — |
| (G) | PTFE | 0.5 | 0.5 | 0.5 | 0.5 | 0.5 | 0.5 | 0.5 | 0.5 | 0.5 | 0.5 | 0.5 | 0.5 |
| Properties of resin composition | units | | | | | | | | | | | *1 | *1 |
| Notched Izod impact strength | kg/cm/cm | 7 | 5 | 6 | 6 | 6 | 5 | 6 | 6 | 22 | 48 | — | — |
| Tensile strength | kg/cm2 | 876 | 681 | 772 | 100 | 879 | 685 | 776 | 1180 | 580 | 580 | — | — |
| Tensile elongation | % | 7 | 18 | 8 | 5 | 8 | 20 | 8 | 6 | 152 | 161 | — | — |

TABLE 2-continued

| Resin composition (weight parts) | | Working Ex. 1 | Working Ex. 2 | Working Ex. 3 | Working Ex. 4 | Working Ex. 5 | Working Ex. 6 | Working Ex. 7 | Working Ex. 8 | Comp. Ex. 1 | Comp. Ex. 2 | Comp. Ex. 3 | Comp. Ex. 4 |
|---|---|---|---|---|---|---|---|---|---|---|---|---|---|
| Flexural strength | kg/cm2 | 1200 | 1100 | 1160 | 1470 | 1210 | 1100 | 1170 | 1510 | 840 | 840 | — | — |
| Flexural modulus | kg/cm2 | 44000 | 40000 | 46000 | 94000 | 44000 | 40000 | 45000 | 82000 | 26000 | 26000 | — | — |
| Melt index | g/10 min | 54 | 62 | 43 | 64 | 56 | 58 | 45 | 51 | 74 | 74 | — | — |
| Load deflection temperature | °C. | 95 | 90 | 94 | 97 | 97 | 91 | 95 | 99 | 87 | 87 | — | — |
| Flame resistance | | V0 | V0 | V0 | V0 | V0 | V0 | V0 | V0 | V0 | V0 | — | — |
| After aging at 80° C. and 98% RH | | | | | | | | | | | | | |
| Aging time | hours | 200 | 600 | 200 | 600 | 200 | 600 | 200 | 600 | 200 | 600 | — | — |
| Tensile strength | kg/cm2 | 484 | 412 | 436 | 385 | 766 | 670 | 652 | 758 | 223 | 535 | — | — |

TABLE 3

| Resin composition (weight parts) | | Working Ex. 9 | Working Ex. 10 | Working Ex. 11 | Working Ex. 12 | Comp. Ex. 5 | Comp. Ex. 6 | Comp. Ex. 7 | Comp. Ex. 8 |
|---|---|---|---|---|---|---|---|---|---|
| (A) PC | | 62 | 62 | 62 | 62 | 62 | 62 | 62 | 62 |
| (B) ABS-1 | | 15 | 15 | 15 | 15 | 15 | 15 | 15 | 15 |
| (C) FR-1 (acid value: 1.6) | | — | — | — | — | 13 | 13 | 13 | 13 |
| FR-2 (acid value: 0.64) | | 13 | 13 | 13 | 13 | — | — | — | — |
| (D) Glass fibers | | 10 | — | 8 | — | 10 | — | 8 | — |
| Talc | | — | 10 | 5 | — | — | 10 | 5 | — |
| Carbon fibers | | — | — | — | 10 | — | — | — | 10 |
| (G) PTFE | | 0.5 | 0.5 | 0.5 | 0.5 | 0.5 | 0.5 | 0.5 | 0.5 |
| Properties of resin composition | units | | | | | | | | |
| Notched Izod impact strength | kg/cm/cm | 6 | 5 | 5 | 6 | 5 | 6 | 5 | 6 |
| Tensile strength | kg/cm2 | 876 | 674 | 761 | 1150 | 854 | 692 | 740 | 1180 |
| Tensile elongation | % | 9 | 18 | 7 | 6 | 8 | 14 | 8 | 5 |
| Flexural strength | kg/cm2 | 1200 | 1130 | 1130 | 1520 | 1180 | 1070 | 1120 | 1580 |
| Flexural modulus | kg/cm2 | 43800 | 39600 | 45300 | 82200 | 43200 | 39500 | 45800 | 81500 |
| Melt index | g/10 min | 55 | 56 | 45 | 48 | 53 | 58 | 47 | 50 |
| Load deflection temperature | °C. | 96 | 92 | 94 | 98 | 97 | 90 | 95 | 98 |
| Flame resistance | | V0 | V0 | V0 | V0 | V0 | V0 | V0 | V0 |
| After aging at 80° C. and 98% RH | | | | | | | | | |
| Aging time | hours | 200 | 600 | 600 | 200 | 200 | 600 | 600 | 200 |
| Tensile strength | kg/cm2 | 555 | 481 | 513 | 442 | 169 | 231 | 218 | 252 |

TABLE 4

| Resin composition (weight parts) | | Working Ex. 13 | Working Ex. 14 | Working Ex. 15 | Working Ex. 16 | Working Ex. 17 | Working Ex. 18 |
|---|---|---|---|---|---|---|---|
| (A) PC | | 62 | 62 | 62 | 62 | 62 | 62 |
| (B) ABS-1 | | 10 | 15 | 15 | 15 | 15 | 15 |
| (C) FR-3 (acid value: 0.03) | | 13 | 13 | 13 | 13 | 13 | 13 |
| (D) Glass fibers | | 10 | 10 | — | — | — | — |
| Talc | | — | — | 10 | 10 | — | — |
| Carbon fibers | | — | — | — | — | 10 | 10 |
| (F) Epoxy-based stabilizer | | — | 0.3 | — | 0.3 | — | 0.3 |
| (G) PTFE | | 0.5 | 0.5 | 0.5 | 0.5 | 0.5 | 0.5 |
| Properties of resin composition | units | | | | | | |
| Notched Izod impact strength | kg/cm/cm | 6 | 6 | 5 | 5 | 6 | 5 |
| Tensile strength | kg/cm2 | 879 | 885 | 685 | 675 | 1180 | 1172 |
| Tensile elongation | % | 8 | 7 | 20 | 17 | 6 | 5 |
| Flexural strength | kg/cm2 | 1210 | 1200 | 1100 | 1140 | 1510 | 1480 |
| Flexural modulus | kg/cm2 | 44000 | 43500 | 40000 | 40300 | 82000 | 81100 |
| Melt index | g/10 min | 56 | 53 | 58 | 55 | 51 | 50 |
| Load deflection temperature | °C. | 97 | 96 | 91 | 91 | 99 | 98 |
| Flame resistance | | V0 | V0 | V0 | V0 | V0 | V0 |
| After aging at 80° C. and 98% RH | | | | | | | |
| Aging time | hours | 600 | 600 | 800 | 800 | 400 | 400 |
| Tensile strength | kg/cm2 | 267 | 753 | 271 | 665 | 720 | 1010 |

TABLE 5

| Resin composition (weight parts) | units | Working Ex. 19 | Working Ex. 20 | Working Ex. 21 | Working Ex. 22 | Working Ex. 23 | Working Ex. 24 | Comparative Example 9 | Comparative Example 10 | Comparative Example 11 |
|---|---|---|---|---|---|---|---|---|---|---|
| (A) PC | | 67 | 67 | 67 | 67 | 67 | 67 | 67 | 67 | 67 |
| (B) ABS-1 | | 10 | 10 | 10 | 10 | 10 | 10 | 10 | 10 | 10 |
| (C) FR-3 (acid value: 0.03) | | 13 | 13 | 13 | 13 | 13 | 13 | 13 | 13 | 13 |
| (D) Glass fibers | | 10 | 10 | — | — | — | — | 10 | — | — |
| Talc | | — | — | 10 | 10 | — | — | — | 10 | — |
| Carbon fibers | | — | — | — | — | 10 | 10 | — | — | 10 |
| (E) Compound rubber | | — | 5 | — | 5 | — | 5 | — | — | — |
| (G) PTFE | | 0.5 | 0.5 | 0.5 | 0.5 | 0.5 | 0.5 | 0.5 | 0.5 | 0.5 |
| (Comparative substance) acrylic rubber | | — | — | — | — | — | — | 5 | 5 | 5 |
| Properties of resin composition | | | | | | | | | | |
| Notched Izod impact strength | kg/cm/cm | 6 | 12 | 5 | 45 | 6 | 11 | 10 | 43 | 11 |
| Tensile strength | kg/cm2 | 891 | 843 | 664 | 624 | 1220 | 1150 | 851 | 615 | 1130 |
| Tensile elongation | % | 8 | 8 | 18 | 85 | 5 | 6 | 9 | 76 | 6 |
| Flexural strength | kg/cm2 | 1240 | 1120 | 1090 | 982 | 1610 | 1540 | 1070 | 967 | 1530 |
| Flexural modulus | kg/cm2 | 44700 | 42500 | 40600 | 39100 | 81500 | 80600 | 42800 | 38600 | 80300 |
| Melt index | g/10 min | 52 | 48 | 49 | 45 | 47 | 43 | 46 | 44 | 42 |
| Load deflection temperature | ° C. | 98 | 98 | 91 | 90 | 98 | 98 | 97 | 90 | 98 |
| Flame resistance | | V0 | V0 | V0 | V0 | V0 | V0 | V1 | V1 | V1 |
| After aging at 80° C. and 98% RH | | | | | | | | | | |
| Aging time | hours | 200 | 200 | 600 | 600 | 200 | 200 | 200 | 600 | 200 |
| Tensile strength | kg/cm2 | 782 | 780 | 652 | 611 | 722 | 736 | 765 | 605 | 745 |

*1: Molding impossible, properties could not be measured.

Working Examples 1 to 8 are resin compositions of the present invention in which various reinforcing agents (D) were used.

Compared to the resin compositions of Comparative Examples 1 and 2, which contained no reinforcing agent (D), [the resin compositions of Working Examples 1 to 8] all had superior mechanical strength, namely, tensile strength, tensile elongation, flexural strength, and flexural modulus. Comparative Examples 3 and 4 contained the reinforcing agent (D) [in an amount] that exceeded the range of the present invention. Molding was impossible in both cases. In Working Examples 5 to 8, the (B) component used in Working Examples 1 to 4 was substituted with a styrene resin whose alkali metal content was 1 weight ppm or less. There was a marked increase in tensile strength after aging in every case.

Working Examples 9 to 12 made use of a phosphoric ester compound (C) with a higher acid value than that in Working Examples 5 to 8, but still within the range of the present invention. There was a certain decrease in tensile strength after aging in every case, but the effect of the present invention was not lost. Comparative Examples 5 to 8 made use of a (C) component having an acid value that exceeded the range of the present invention. There was a marked increase in tensile strength after aging in every case.

In Working Examples 13 to 18, we examined the effect of adding the epoxy-based stabilizer (F). It can be seen that the addition of (F) markedly increases the tensile strength after aging.

In Working Examples 19 to 24, we examined the effect of adding the compound rubber-based graft copolymer (E). It can be seen that the addition of (E) markedly increases the Izod impact strength. In Comparative Examples 9 to 11, an acrylic rubber was used instead of (E). This is undesirable because although the Izod impact strength can be raised, the flame resistance decreases.

EFFECT OF THE INVENTION

The present invention provides a polycarbonate resin composition that has excellent moisture resistance, good flame resistance, and markedly superior mechanical strength.

What is claimed is:

1. A resin composition, comprising:
   (A) 62 to 67 weight parts of a polycarbonate resin having a viscosity average molecular weight of 10,000 to 40,000;
   (B) 6 to 15 weight parts of an acrylonitrile/butadiene/styrene copolymer;
   (C) a bisphenol A tetraphenyl diphosphate with an acid value of 0.1 or less, in an amount of 5 to 20 weight parts per combined 100 weight parts of (A)+(B);
   (D) a reinforcing agent in an amount of 4 to 70 weight parts per combined 100 weight parts of (A)+(B)+(C), wherein the reinforcing agent is selected from the group consisting of talc, glass fibers, carbon fibers, glass flakes, milled glass, wollastonite, potassium titanate, calcium carbonate, barium sulfate, and mica; and
   (E) a compound rubber-based graft copolymer produced by grafting a vinyl monomer to a compound rubber containing a polyorganosiloxane and a polyalkyl (meth)acrylate, in an amount of 1 to 10 weight parts per combined 100 weight parts of (A)+(B)+(C).

2. The resin composition as defined in claim 1, further comprising up to 9 weight parts of a styrene/acrylonitrile copolymer.

3. A resin composition, comprising:
   (A) 1 to 99 weight parts of a polycarbonate resin having a viscosity average molecular weight of 10,000 to 100,000;
   (B) 1 to 99 weight parts of a styrene resin, wherein the styrene resin (B) is selected from the group consisting of an acrylonitrile/butadiene/styrene copolymer, an acrylonitrile/ethylene/propylene/styrene copolymer, an acrylonitrile/chlorinated polyethylene/styrene copolymer, an acrylonitrile/acrylic elastomer/styrene copolymer, and a styrene/acrylonitrile copolymer;
   (C) a phosphoric ester compound selected from bisphenol A tetraphenyl diphosphate and bisphenol A tetraxylyl diphosphate, wherein the phosphoric ester compound has an acid value of 1 or less and is present in an amount of 1 to 40 weight parts per combined 100 weight partS of (A)+(B);

(D) a reinforcing agent in an amount of 1 to 100 weight parts per combined 100 weight parts of (A)+(B)+(C); and (E) a compound rubber-based graft copolymer produced by grafting a vinyl monomer to a compound rubber containing a polyorganosiloxane and a polyalkyl (meth)acrylate in an amount of 1 to 10 weight parts per combined 100 weight parts of (A)+(B)+(C).

4. The resin composition as defined in claim 3, wherein the styrene resin (B) has an alkali metal concentration of 1 weight ppm or less.

5. The resin composition as defined in claim 3, wherein the styrene resin (B) has a sodium ion concentration of 0.5 weight ppm or less.

6. The resin composition as defined in claim 3, further comprising:

(F) an epoxy-based stabilizer in an amount of 0.01 to 10 weight parts per combined 100 weight parts of (A)+(B).

7. The resin composition as defined in claim 3, wherein the styrene resin (B) is selected from the group consisting of an acrylonitrile/ethylene/propylene/styrene copolymer, an acrylonitrile/chlorinated polyethylene/styrene copolymer, an acrylonitile/acrylic elastomer/styrene copolymer, and a styrene/acrylonitrile copolymer.

8. The resin composition as defined in claim 3, wherein the styrene resin (D) has a potassium ion concentration of 1 weight ppm or less.

9. The resin composition as defined in claim 3, wherein the reinforcing agent (D) comprises at least one reinforcing agent selected from the group consisting of talc, mica, glass fibers, glass flakes, milled glass, carbon fibers, aramid fibers, silica, glass beads, glass balloons, silica balloons, metal fibers, metal powder, wollastonite, potassium titanate, silicon carbide, calcium carbonate, magnesium carbonate, graphite, barium sulfate, barium sulfate, and charcoal powder.

10. The resin composition as defined in claim 6, wherein the epoxy-based stabilizer (F) comprises 3,4-epoxycyclohexyl-methyl-3',4'-epoxycyclohexane carboxylate.

11. The resin composition as defined in claim 3, further comprising:

(G) a fluorinated polyolefin in an amount of 0.01 to 3 weight parts per combined 100 weight parts of (A)+(B).

12. A resin composition, comprising:

(A) 1 to 99 weight parts of a polycarbonate resin having a viscosity average molecular weight of 10,000 to 40,000;

(B) 1 to 99 weight parts of an ABS resin;

(C) a bisphenol A tetraphenyl diphosphate with an acid value of 1 or less, in an amount of 5 to 20 weight parts per combined 100 weight parts of (A)+(B);

(D) a reinforcing agent in an amount of 4 to 70 weight parts per combined 100 weight parts of (A)+(B)+(C), wherein the reinforcing agent is selected from the group consisting of talc, glass fibers, carbon fibers, glass flakes, mixe glass, wollastonite, potassium titanate, calcium carbonate, barium sulfate, and mica; and (E) a compound rubber-based graft copolymer produced by grafting a vinyl monomer to a compound rubber containing a polyorganosiloxane and a polyalkyl (meth)acrylate, in an amount of 1 to 10 weight parts per combined 100 weight parts of (A)+(B)+(C).

13. The resin composition as described in claim 12, further comprising:

(G) a fluorinated polyolefin in an amount of 0.01 to 3 weight parts per combined 100 weight parts of (A)+(B).

14. The resin composition as defined in claim 3, wherein the phosphoric ester compound has an acid value of 0.5 or less.

15. The resin composition as defined in claim 3, wherein the phosphoric ester compound has an acid value of 0.2 or less.

16. The resin composition as defined in claim 3, wherein the phosphoric ester compound has an acid value of 0.1 or less.

* * * * *